United States Patent
Umeda et al.

(10) Patent No.: US 11,797,845 B2
(45) Date of Patent: Oct. 24, 2023

(54) MODEL LEARNING DEVICE, MODEL LEARNING METHOD, AND PROGRAM

(71) Applicant: NIPPON TELEGRAPH AND TELEPHONE CORPORATION, Tokyo (JP)

(72) Inventors: Takayuki Umeda, Tokyo (JP); Kazuhiko Murasaki, Tokyo (JP); Shingo Ando, Tokyo (JP); Tetsuya Kinebuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 359 days.

(21) Appl. No.: 17/058,099

(22) PCT Filed: May 28, 2019

(86) PCT No.: PCT/JP2019/021119
§ 371 (c)(1),
(2) Date: Nov. 23, 2020

(87) PCT Pub. No.: WO2019/230727
PCT Pub. Date: Dec. 5, 2019

(65) Prior Publication Data
US 2021/0216818 A1    Jul. 15, 2021

(30) Foreign Application Priority Data
May 28, 2018 (JP) ................................ 2018-101735

(51) Int. Cl.
*G06N 3/08*    (2023.01)
*G06F 18/214*    (2023.01)
(Continued)

(52) U.S. Cl.
CPC ............. *G06N 3/08* (2013.01); *G06F 18/214* (2023.01); *G06F 18/253* (2023.01); *G06N 3/045* (2023.01);
(Continued)

(58) Field of Classification Search
None
See application file for complete search history.

(56) References Cited

U.S. PATENT DOCUMENTS

2020/0342643 A1* 10/2020 Gouws .................... G06F 16/55

OTHER PUBLICATIONS

Hariharan et al. (2015) "Hypercolumns for Object Segmentation and Fine-grained Localization," Proceedings of the IEEE Conference on Computer Vision and Pattern Recognition, pp. 447-456.
(Continued)

*Primary Examiner* — Leon Flores

(57) ABSTRACT

Simultaneous learning of a plurality of different tasks and domains, with low costs and high precision, is enabled. A learning unit 160, on the basis of learning data, uses a target encoder that takes data of a target domain as input and outputs a target feature expression, a source encoder that takes data of a source domain as input and outputs a source feature expression, a common encoder that takes data of the target domain or the source domain as input and outputs a common feature expression, a target decoder that takes output of the target encoder and the common encoder as input and outputs a result of executing a task with regard to data of the target domain, and a source decoder that takes output of the source encoder and the common encoder as input and outputs a result of executing a task with regard to data of the source domain, to learn so that the output of the target decoder matches training data, and the output of the source decoder matches training data.

20 Claims, 6 Drawing Sheets

(51) Int. Cl.
  *G06F 18/25*    (2023.01)
  *G06N 3/045*    (2023.01)
  *G06V 10/764*   (2022.01)
  *G06V 10/774*   (2022.01)
  *G06V 10/80*    (2022.01)
  *G06V 10/82*    (2022.01)

(52) U.S. Cl.
  CPC .......... *G06V 10/764* (2022.01); *G06V 10/774* (2022.01); *G06V 10/806* (2022.01); *G06V 10/82* (2022.01)

(56) References Cited

OTHER PUBLICATIONS

Bousmalis et al. (2016) "Domain Separation Networks," 29th Conference on Neural Information Processing Systems (NIPS 2016), Barcelona, Spain, pp. 343-351.

* cited by examiner

MODEL LEARNING DEVICE, MODEL LEARNING METHOD, AND PROGRAM

CROSS-REFERENCE TO RELATED APPLICATIONS

This application is a U.S. 371 Application of International Patent Application No. PCT/JP2019/021119, filed on 28 May 2019, which application claims priority to and the benefit of JP Application No. 2018-101735, filed on 28 May 2018, the disclosures of which are hereby incorporated herein by reference in their entireties.

TECHNICAL FIELD

The present invention relates to a model learning device, a model learning method, and a program, and more particularly relates to a model learning device, a model learning method, and a program for simultaneously learning a plurality of domains and tasks.

BACKGROUND ART

Sophistication of machine learning technology has come to lead to various types of social activities, which humans conventionally had performed, being performed more efficiently by being performed alternatively by machines.

For example, image recognition based on machine learning is playing an important role in automatic driving of automobiles. Image recognition alone requires various outputs, such as recognition of the position of a traffic sign in an image (Detection), recognition of text in the traffic sign (Classification), white lines for deciding a line of travel, recognition of nearby objects such as vehicles, people, and so forth, on a pixel level (Segmentation), and so forth. Machine learning techniques suited for each task have conventionally been invented, to satisfy such requests.

Enormous amounts of learning data are necessary for each task in normal machine learning, requiring extremely great calculation costs and human costs for creating the learning data, time for learning, and verification of learning results. That is to say, in a case of learning each task individually in a product realized by a combination of a great number of tasks as described above, these costs can greatly increase depending on the number of tasks.

In order to solve such problems, the technology disclosed in NPL 1, for example, realizes learning of different tasks with the same model, by feature expressions where multi-scales, which are important elements in common in both tasks of Detection and Segmentation, have been embedded.

One reason why the costs of creating learning data are great is the difference according to domains. In the above example of automatic driving, when recognizing automobiles, the way that automobiles "look" from an onboard camera (domain) and the way that automobiles "look" in a catalog image or the like (domain) greatly differ, so applying an automobile recognizer that has learned using a catalog to an onboard camera results in reduced precision.

Accordingly, a model that is to be used in a certain domain needs to learn using data of the same domain. However, in the above example, images of the latter are relatively easy to obtain, but images of the former are difficult to obtain, and annotation costs, such as model, position of automobile, and so forth, are great.

In order to solve such problems, the technology disclosed in NPL 2, for example, realizes training of an identifier that can be used in common between two different domains, by learning feature expressions common to two domains and feature expressions unique to each domain, and using only common feature expressions.

CITATION LIST

Non Patent Literature

NPL [1] Hariharan, B., Arbelaez, P., Girshick, R., & Malik, J. "Hypercolumns for object segmentation and fine-grained localization", In Proceedings of the IEEE conference on computer vision and pattern recognition, 2015, pp. 447-456.

[NPL 2] Bousmalis, K., Trigeorgis, G., Silberman, N., Krishnan, D., & Erhan, D., "Domain separation networks", in Advances in Neural Information Processing Systems, 2016, pp. 343-351.

SUMMARY OF THE INVENTION

Technical Problem

However, the technology disclosed in NPL 1 and NPL 2 enables learning of models that is not dependent on tasks and domains, by using feature expressions common to different tasks and domains. However, neither technology takes into consideration feature expressions unique to each task or each domain, and accordingly there has been a problem in that sufficient precision cannot be obtained in comparison with models specialized for each task.

The technology disclosed in NPL 1 defines feature expressions by extracting only scale information that is valid in common, in both Detection and Segmentation, and does not use information valid in individual tasks, such as scale information valid only for Detection, scale information valid only for Segmentation, and so forth.

Also, the technology disclosed in NPL 2 uses feature expressions unique to domains as one type of constraint at the time of obtaining feature expressions common to domains, but does not use feature expressions unique to domains for input when learning a model. Also, scale information is fixed, and accordingly sufficient precision cannot be obtained when applying to Detection and Segmentation where various types of scale information are valid, so valid tasks are limited.

Accordingly, a general-purpose learning method for simultaneously learning different tasks and different domains has not been established.

The present invention has been made in light of the above points, and it is an object thereof to provide a model learning device, a model learning method, and a program for simultaneously learning a plurality of different tasks and domains, which is low in costs and high in precision.

Means for Solving the Problem

A model learning device according to the present invention learns a model for outputting a result of execution of a task with regard to data of a target domain and a model for outputting a result of execution of a task with regard to data of a source domain, where, in the result of execution, the task with regard to data of the target domain and the task with regard to data of the source domain are different, or the target domain and the source domain are different. The model learning device includes an input unit that accepts input of learning data that is a set of data of the target domain and training data that is the result of executing a task with regard to data of the target domain, and a set of data of the source domain and training data that is the result of executing a task with regard to data of the source domain, and a learning unit that, on the basis of the learning data, uses a target encoder that takes data of the target domain as input and outputs a target feature expression, a source encoder that takes data of the source domain as input and outputs a source feature expression, a common encoder that takes data of the target domain or data of the source domain as input and outputs a common feature expression, a target decoder that takes output of the target encoder and output of the common encoder as input and outputs a result of executing a task with regard to data of the target domain, and a source decoder that takes output of the source encoder and output of the common encoder as input and outputs a result of executing a task with regard to data of the source domain, to learn the target encoder, the source encoder, the common encoder, the target decoder, and the source decoder, so that the output of the target decoder matches the training data, and the output of the source decoder matches the training data.

Also, a model learning method according to the present invention is a model learning method of learning a model for outputting a result of execution of a task with regard to data of a target domain and a model for outputting a result of execution of a task with regard to data of a source domain, where, in the result of execution, the task with regard to data of the target domain and the task with regard to data of the source domain are different, or the target domain and the source domain are different. The model learning method includes an input unit accepting input of learning data that is a set of data of the target domain and training data that is the result of executing a task with regard to data of the target domain, and a set of data of the source domain and training data that is the result of executing a task with regard to data of the source domain, and a learning unit learning, on the basis of the learning data, using a target encoder that takes data of the target domain as input and outputs a target feature expression, a source encoder that takes data of the source domain as input and outputs a source feature expression, a common encoder that takes data of the target domain or data of the source domain as input and outputs a common feature expression, a target decoder that takes output of the target encoder and output of the common encoder as input and outputs a result of executing a task with regard to data of the target domain, and a source decoder that takes output of the source encoder and output of the common encoder as input and outputs a result of executing a task with regard to data of the source domain, to learn the target encoder, the source encoder, the common encoder, the target decoder, and the source decoder, so that the output of the target decoder matches the training data, and the output of the source decoder matches the training data.

According to the model learning device and model learning method of the present invention, the input unit accepts input of learning data that is a set of data of a target domain and training data that is the result of executing a task with regard to data of the target domain, and a set of data of a source domain and training data that is the result of executing a task with regard to data of the source domain.

The learning unit then, on the basis of the learning data, learns the target encoder, the source encoder, the common encoder, the target decoder, and the source decoder, so that the output of the target decoder matches the training data, and the output of the source decoder matches the training data, using the target encoder that takes data of the target domain as input and outputs a target feature expression, the source encoder that takes data of the source domain as input and outputs a source feature expression, the common encoder that takes data of the target domain or data of the source domain as input and outputs a common feature expression, the target decoder that takes output of the target encoder and output of the common encoder as input and outputs a result of executing a task with regard to data of the target domain, and the source decoder that takes output of the source encoder and output of the common encoder as input and outputs a result of executing a task with regard to data of the source domain.

Thus, by learning, on the basis of the learning data, so that the output of the target decoder matches the training data, and the output of the source decoder matches the training data, using the target encoder that takes data of the target domain as input and outputs a target feature expression, the source encoder that takes data of the source domain as input and outputs a source feature expression, the common encoder that takes data of the target domain or data of the source domain as input and outputs a common feature expression, the target decoder that takes output of the target encoder and output of the common encoder as input and outputs a result of executing a task with regard to data of the target domain, and the source decoder that takes output of the source encoder and output of the common encoder as input and outputs a result of executing a task with regard to data of the source domain, a plurality of different tasks and domains can be simultaneously learned, with low costs and high precision.

Also, the learning unit of the model learning device according to the present invention may learn the target encoder, the source encoder, the common encoder, the target decoder, and the source decoder, using a loss function representing output of the target decoder and the training data matching, a loss function representing output of the source decoder and the training data matching, a loss function representing output of the common encoder taking data of the target domain as input and output of the common encoder taking data of the source domain as input being the same expression, a loss function representing output of the target decoder and output of the common encoder taking data of the target domain as input being different expressions, and a loss function representing output of the source decoder and output of the common encoder taking data of the source domain as input being different expressions.

Also, the target decoder of the model learning device according to the present invention may take an addition of output of the target encoder and output of the common encoder, or a combination of output of the target encoder and output of the common encoder, as input, and the source decoder may take an addition of output of the source encoder and output of the common encoder, or a combination of output of the source encoder and output of the common encoder, as input.

Also, a configuration may be made where the target encoder, the source encoder, the common encoder, the target decoder, and the source decoder of the model learning device according to the present invention are each a multi-layer-structure neural network.

Also, the target decoder of the model learning device according to the present invention may take output of the target encoder and output of the common encoder as input, and further output a result of executing a task with regard to data of the target domain, using an intermediate expression obtained at an intermediate layer of the target encoder and an intermediate expression obtained at an intermediate layer of the common encoder. The source decoder may take output of the source encoder and output of the common encoder as input, and further output a result of executing a task with regard to data of the source domain, using an intermediate expression obtained at an intermediate layer of the source encoder and an intermediate expression obtained at an intermediate layer of the common encoder.

A program according to the present invention is a program that causes functioning as components of the above-described model learning device.

Effects of the Invention

According to the model learning device, model learning method, and program of the present invention, a plurality of different tasks and domains can be simultaneously learned, with low costs and high precision.

DESCRIPTION OF EMBODIMENTS

An embodiment of the present invention will be described below with reference to the Figures.

<Configuration of Model Learning Device According to Embodiment of Present Invention>

Figure 1:
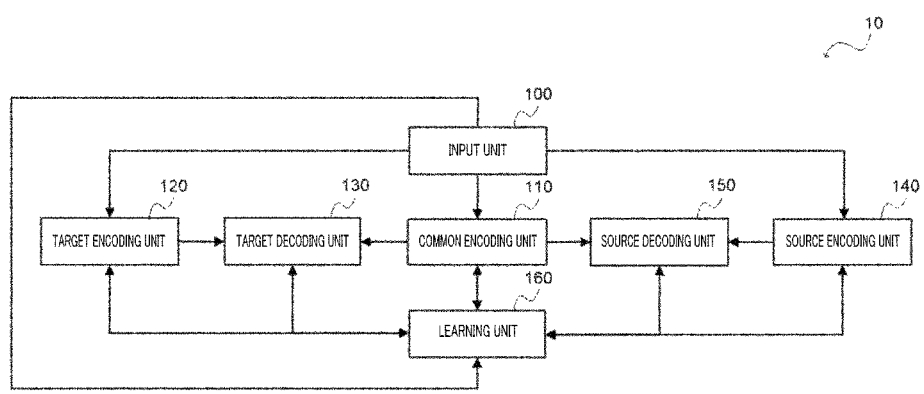
FIG. 1 is a block diagram illustrating a configuration of a model learning device according to an embodiment of the present invention.

The configuration of the model learning device 10 according to the embodiment of the present invention will be described with reference to FIG. 1. FIG. 1 is a block diagram illustrating the configuration of the model learning device 10 according to the embodiment of the present invention.

The model learning device 10 performs learning of a model for outputting a result of execution of a task with regard to data of a target domain and a model for outputting a result of execution of a task with regard to data of a source domain, where, in the result of execution, the task with regard to data of the target domain and the task with regard to data of the source domain are different, or the target domain and the source domain are different.

Note that in the present embodiment, an example of a case where the type of data is image data
x
will be described.

Figure 2:
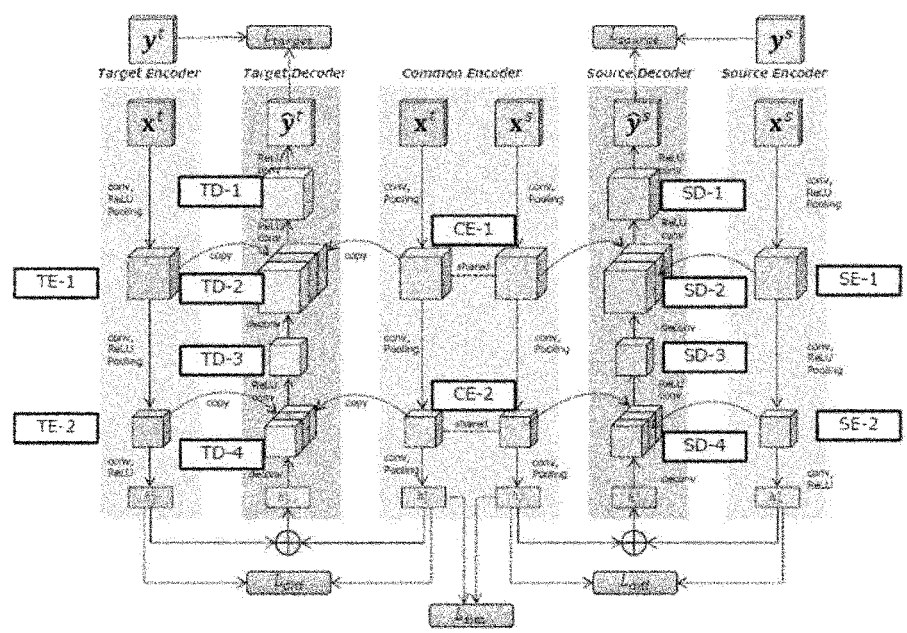
FIG. 2 is a diagram illustrating an example of a model relating to the model learning device according to the embodiment of the present invention.

FIG. 2 is a conceptual diagram illustrating an example of this model. The model for outputting the result of execution of a task regarding data of a target domain is expressed by two encoders of a common encoder (Common Encoder) and target encoder (Target Encoder), and one decoder of a target decoder (Target Decoder), and the model for outputting the result of execution of a task regarding data of a source domain is expressed by two encoders of a common encoder and source encoder (Source Encoder), and one decoder of a source decoder (Source Decoder), as illustrated in FIG. 2. The encoders and the decoders are configured using a multilayer-structure neural network.

Each encoder and each decoder has the same network configuration.

Note that with regard to the final layer of each decoder, the layer may be changed in accordance with the task. For example, an arrangement may be made where a layer is set for the target decoder to output as many probability values as there are classes in order to handle recognition problems, and a layer is set for the source decoder to output tensors indicating probability values for each of the classes of each pixel, in vertical-axis coordinate x horizontal-axis coordinate x number of classes, to handle segmentation problems.

The model learning device 10 learns parameters of the encoders and the decoders.

The model learning device 10 is configured of a computer provided with a CPU, RAM, and ROM storing a program for executing a later-described model learning processing routine and calculation processing routine, and functionally is configured as follows.

The model learning device 10 according to the present embodiment is configured having been provided with an input unit 100, a common encoding unit 110, a target encoding unit 120, a target decoding unit 130, a source encoding unit 140, a source decoding unit 150, and a learning unit 160, as illustrated in FIG. 1.

The input unit 100 accepts input of learning data that is a set of data of a target domain and training data that is the result of executing a task with regard to data of the target domain, and a set of data of a source domain and training data that is the result of executing a task with regard to data of the source domain.

Specifically, the input unit 100 accepts input of learning data, which is a set of image data
$x^t$
of the target domain and training data
$y^t$
which is the result of executing a task with regard to the image data
$x^t$,
and a set of image data
$x^s$
of the source domain and training data
$y^s$
which is the result of executing a task with regard to the image data
$x^s$.

The input unit 100 then hands the image data
$x^t$
and the image data
$x^s$
included in the accepted learning data to the common encoding unit 110. The input unit 100 also hands the image data
$x^t$
to the target encoding unit 120. The input unit 100 further hands the image data
$x^s$
to the source encoding unit 140. Moreover, the input unit 100 hands the training data
$y^t$
and the training data
$y^s$
to the learning unit 160.

The common encoding unit 110 executes encoding processing using the common encoder that takes data of the target domain or data of the source domain as input and outputs common feature expressions.

Specifically, the common encoder takes image data x as input and subjects the input image data x to convolution (cony) and pooling (Pooling) by a plurality of layers, and outputs a compressed common feature expression $h_c$.

Output of each intermediate layer of the common encoder is expressed as intermediate expression CE-n (where n is a number no smaller than 1 and no larger than N that is the number of layers). In the present embodiment, there are two intermediate layers as illustrated in FIG. 2, so the outputs of the intermediate layers are expressed as intermediate expressions CE-1 and CE-2.

The common encoder uses a network that has the same parameters regardless of the domain of the input data. An optional configuration can also be employed for the network to obtain the common feature expression $h_c$, and a VGG or the like can be used, for example.

Now, the common encoder uses a network that has the same parameters regardless of the domain of the input data, but for the sake of convenience, the output at the time of input of image data $x^t$ will be common feature expression $h_c^t$, and the output at the time of input of image data $x^s$ will be common feature expression $h_c^s$.

The common encoding unit 110 then hands the common feature expression $h_c^t$ obtained by encoding processing using the common encoder, and the intermediate expressions CE-1 and CE-2, to the target decoding unit 130. The common encoding unit 110 further hands the common feature expression $h_c^s$ and the intermediate expressions CE-1 and CE-2 to the source decoding unit 150. The common encoding unit 110 further hands the common feature expressions $h_c^t$ and $h_c^s$ to the learning unit 160.

The target encoding unit 120 uses the target encoder that takes the data of the target domain as input and outputs the target feature expression to execute encoding processing.

Specifically, the target encoder takes image data $x^t$ as input and subjects the input image data $x^t$ to convolution and pooling by a plurality of layers, and outputs a compressed target feature expression $h_p^t$.

Output of each intermediate layer of the target encoder is expressed as intermediate expression TE-n. In the present embodiment, there are two intermediate layers as illustrated in FIG. 2, so the outputs of the intermediate layers are expressed as intermediate expressions TE-1 and TE-2.

The target encoding unit 120 then hands the target feature expression $h_p^t$ obtained by encoding processing using the target encoder, and TE-1 and TE-2, to the target decoding unit 130. Further, the target encoding unit 120 hands the target feature expression $h_p^t$ to the learning unit 160.

The target decoding unit 130 executes decoding processing using the target decoder that takes the output of the target encoder and the output of the common encoder as input and outputs the result of execution of the task regarding the data of the target domain.

Specifically, first, the target decoding unit 130 takes $h_{p,c}^t$ obtained by adding the target feature expression $h_p^t$ that is the output of the target encoder, and the common feature expression $h_c^t$ that is the output of the common encoder, as the input of the target decoder. Note that when adding the target feature expression $h_p^t$ and the common feature expression $h_c^t$ that is the output of the common encoder, both may be weighted. Alternatively, instead of an adding, this may be a combining $h_{p,c}^t$ of the two.

Thus, simultaneously inputting the target feature expression $h_p^t$ and the common feature expression $h_c^t$ that is the output of the common encoder, to the target decoder, gives consideration to both expressions unique to domain and task and expressions common to both, unlike in NPL 1 and NPL 2. Accordingly, there is more information that can be used for learning as compared with models specialized to the domains and tasks, and learning of models with low costs and high precision can be realized.

Next, the target decoder performs deconvolution/upconvolution of the input $h_{p,c}^t$.

The size of output data TD-4 of the deconvolution is the same as the intermediate expression TE-2 that is the output of the second intermediate layer of the target decoder and the intermediate expression CE-2 that is the output of the second intermediate layer of the common encoder.

The target decoder then performs convolution of a feature expression obtained by combining intermediate expressions TE-2 and CE-2 with the obtained TD-4, thereby obtaining TD-3.

Next, the target decoder further performs deconvolution of the obtained TD-3, and obtains TD-2. The size of TD-2 is the same as the intermediate expressions TE-1 and CE-1.

The target decoder then performs convolution of a feature expression obtained by combining intermediate expressions TE-1 and CE-1 with the obtained TD-2, thereby obtaining TD-1. The target decoder performs convolution of this TD-1, and obtains $\hat{y}^t$ as the output thereof. Note that the output $\hat{y}^t$ of the target decoder is data of the same format as the training data $y^t$, and is an estimation result of this model regarding the result of execution of the task on data of the target domain.

The target decoding unit 130 then hands the obtained by the target decoder to the learning unit 160.

The source encoding unit 140 executes encoding processing using the source encoder that takes data of the source domain as input and outputs source feature expressions.

Specifically, the source encoder takes image data $x^s$ as input and subjects the input image data $x^s$ to convolution and pooling by a plurality of layers, and outputs a compressed source feature expression $h_p^s$.

Output of each intermediate layer of the source encoder is expressed as intermediate expression SE-n. In the present embodiment, there are two intermediate layers as illustrated in FIG. 2, so the outputs of the intermediate layers are expressed as intermediate expressions SE-1 and SE-2.

The source encoding unit 140 then hands the source feature expression $h_p^s$ obtained by processing at the source encoder, and SE-1 and SE-2, to the source decoding unit 150. Further, the source encoding unit 140 hands the source feature expression $h_p^s$ to the learning unit 160.

The source decoding unit 150 executes decoding processing using the source decoder that takes the output of the source encoder and the output of the common encoder as input and outputs the result of execution of the task regarding the data of the source domain.

Specifically, first, the source decoding unit 150 takes $h_{p,c}^s$ obtained by adding the source feature expression $h_p^s$ that is the output of the source encoder, and the common feature expression $h_c^s$ that is the output of the common encoder, as the input of the source decoder, in the same way as the target decoding unit 130. Note that when adding the source feature expression $h_p^s$ and the common feature expression $h_c^s$ that is the output of the common encoder, both may be weighted. Alternatively, instead of adding, this may be a combining $h_{p,c}^s$ of the two.

Next, the source decoder performs deconvolution of the input

The size of output data SD-4 of the deconvolution is the same as the intermediate expression SE-2 that is the output of the second intermediate layer of the source decoder and the intermediate expression CE-2 that is the output of the second intermediate layer of the common encoder.

The source decoder then performs convolution of a feature expression obtained by combining intermediate expressions SE-2 and CE-2 with the obtained SD-4, thereby obtaining SD-3.

Next, the source decoder performs deconvolution of the obtained SD-3, and obtains SD-2. The size of SD-2 is the same as the intermediate expressions SE-1 and CE-1.

The source decoder then performs convolution of a feature expression obtained combining intermediate expressions SE-1 and CE-1 with the obtained SD-2, thereby obtaining SD-1. The source decoder performs convolution of this SD-1, and obtains $\hat{y}^s$ as the output thereof. Note that the output $\hat{y}^s$ of the source decoder is data of the same format as the training data $y^s$, and is an estimation result of this model regarding the execution result of the task on data of the source domain.

The source decoding unit 150 then hands the $\hat{y}^s$ obtained by the source decoder to the learning unit 160.

The learning unit 160 performs learning of the target encoder, source encoder, common encoder, target decoder, and source decoder, using a loss function representing output of the target encoder and the training data matching, a loss function representing output of the source decoder and the training data matching, a loss function representing output of the common encoder when taking data of the target domain as input and output of the common encoder when taking data of the source domain as input being the same expression, a loss function representing output of the target decoder and output of the common encoder when taking data of the target domain as input being different expressions, and a loss function representing output of the source decoder and output of the common encoder when taking data of the source domain as input being different expressions, on the basis of the learning data.

Specifically, the learning unit 160 defines a loss function such as in Expression (1) below, using the obtained target feature expression $h_p^t$, source feature expression $h_p^s$, common feature expressions $h_c^t$ and $h_c^s$, target decoder output $\hat{y}^t$, source decoder output $\hat{y}^s$, and training data $y^t$ and $y^s$ to learn parameters of the encoders and decoders where the loss function is minimized.

[Formula 1]

$$L = \alpha L_{target} + \beta L_{source} + \gamma L_{diff} + \delta L_{sim} \quad (1)$$

Note that α, β, γ, and δ here are hyperparameters that adjust the degree of influence of each term, where α=β=γ=δ=0.25 or the like, for example.

Note that in Expression 1 above, loss functions corresponding to the task are used for $L_{target}$ and $L_{source}$.

For example, if the target domain and source domain are both tasks regarding a class identification problem, $L_{target}$ and $L_{source}$ are set as in the following Expressions (2) and (3), using cross entropy.

[Formula 2]

$$L_{target} = -\sum_i^K y_i^t \log(\hat{y}_i^t) \quad (2)$$

$$L_{source} = -\sum_i^K y_i^s \log(\hat{y}_i^s) \quad (3)$$

Here, K is the number of classes,
$\hat{y}_i^t$
is a probability value (estimation result) for an i'th class regarding image data of the target domain, and
$y_i^t$
is a binary (training data) of whether or not the image data of the target domain is included in the i'th class. In the same way,
$\hat{y}_i^s$
is a probability value (estimation result) for an i'th class regarding image data of the source domain, and
$y_i^s$
is a binary (training data) of whether or not the image data of the source domain is included in the i'th class.

Also,
$y^t = [y_1^t, \ldots, y_K^t]$, $y^s = [y_1^s, \ldots, y_K^s]$, $\hat{y}^t = [\hat{y}_1^t, \ldots, \hat{y}_K^t]$, $\hat{y}^s = [\hat{y}_1^s, \ldots, \hat{y}_K^s]$
holds.

Also, for example, if the target domain and source domain are both tasks regarding segmentation of each class, $L_{target}$ and $L_{source}$ are set as in the following Expressions (4) and (5), using cross entropy regarding labels calculated for each pixel.

[Formula 3]

$$L_{target} = -\sum_u \sum_i^K y_i^t(u) \log(\hat{y}_i^t(u)) \quad (4)$$

$$L_{source} = -\sum_u \sum_i^K y_i^s(u) \log(\hat{y}_i^s(u)) \quad (5)$$

Here, K is the number of classes,
u
is a vector indicating the position of an image or training data,
$\hat{y}_i^t(u)$
is a probability value (estimation result) for an i'th class at coordinate
u
of image data of the target domain, and
$y_i^t(u)$
is a binary (training data) of whether or not the coordinate
u
of image data of the target domain is included in the i'th class. In the same way,
$\hat{y}_i^s(u)$
is a probability value (estimation result) for an i'th class at coordinate
u
of image data of the source domain, and
$y_i^s(u)$
is a binary (training data) of whether or not the coordinate
u
of image data of the source domain is included in the i'th class.

Also,
$y^t(u) = [y_1^t(u), \ldots, y_K^t(u)]$, $y^s = [y_1^s(u), \ldots, y_K^s(u)]$,
$\hat{y}^t(u) = [\hat{y}_1^t(u), \ldots, \hat{y}_K^t(u)]$, $\hat{y}^s(u) = [\hat{y}_1^s(u), \ldots, \hat{y}_K^s(u)]$
holds.

Also, for example, a Dice score shown in Reference Literature 1 may be used as the loss functions $L_{target}$ and $L_{source}$.

[Reference Literature 1] Fidon, L., Li, W., Garcia-Peraza-Herrera, L. C., Ekanayake, J., Kitchen, N., Ourselin, S., & Vercauteren, T, Generalised wasserstein dice score for imbalanced multi-class segmentation using holistic convolutional networks. arXiv preprint arXiv:1707.00478, 2017.

Also, in a case where the tasks of the target domain and source domain are different, for example, loss functions are set in accordance with each. For example, in a case where the task of the target domain is segmentation of each class, and the task of the source domain is a class identification problem, the loss functions $L_{target}$ and $L_{source}$ are set as in the following Expression (6) and Expression (7).

[Formula 4]

$$L_{target} = -\sum_u \sum_i^K y_i^t(u) \log(\hat{y}_i^t(u)) \quad (6)$$

$$L_{source} = -\sum_i^K y_i^s \log(\hat{y}_i^s) \quad (7)$$

Also, in the above Expression (1), $L_{sim}$ is a loss function that applies a constraint so that common feature expressions
$h_c^t$
and
$h_c^s$
become the same expression regardless of the input domain. That is to say, the loss function $L_{sim}$ is for making the output of the common encoder to be the same sort of expression when different domain data is input.

For example, the loss function $L_{sim}$ is set as in the following Expression (8), using MSE (least square error).

[Formula 5]

$$L_{sim} = (h_c^t - h_c^s)^2 / 2 \quad (8)$$

As other examples, MMD loss shown in Reference Literature 2 and DANN loss shown in Reference Literature 3 may be used.

[Reference Literature 2] Gretton, A., Borgwardt, K. M., Rasch, M. J., Scholkopf, B., & Smola, A, A kernel two-sample test. Journal of Machine Learning Research, 13 Mar. 2012, 723-773.

[Reference Literature 3] Ajakan, H., Germain, P., Larochelle, H., Laviolette, F., & Marchand, M, Domain-adversarial neural networks. arXiv preprint arXiv: 1412.4446, 2014.

Also, in the above Expression (1) $L_{diff}$ is a loss function that applies a constraint so that the target feature expression
$h_p^t$
and common feature expression
$h_c^t$
are different expressions, and so that the source feature expression
$h_p^s$
and common feature expression
$h_c^s$
are different expressions.

For example, the loss function $L_{diff}$ is set as shown in the following Expression (9) using an inverse of MSE.

[Formula 6]

$$L_{diff}=(h_p^t-h_c^t)^{-2}+(h_p^s-h_c^s)^{-2} \quad (9)$$

As another example, orthogonality conditions such as shown in NPL 2 may be added to set the loss function $L_{diff}$ as in the following Expression (10).

[Formula 7]

$$L_{diff}=\|h_p^t Th_c^t\|+\|h_p^s Th_c^s\| \quad (10)$$

Note that the $\|\bullet\|$ in Expression (10) indicates a squared Frobenius norm.

That is to say, a model can be obtained for each of a target-domain task and a source-domain task by the learning unit 160 performing learning on the basis of such a loss function (Expression (1)).

The learning unit 160 then hands learned target encoder parameters to the target encoding unit 120. The learning unit 160 also hands learned source encoder parameters to the source encoding unit 140. The learning unit 160 further hands learned common encoder parameters to the common encoding unit 110. The learning unit 160 further hands learned target decoder parameters to the target decoding unit 130. The learning unit 160 moreover hands learned source decoder parameters to the source decoding unit 150.

<Operations of Model Learning Device According to Embodiment of Present Invention>

Figure 3:
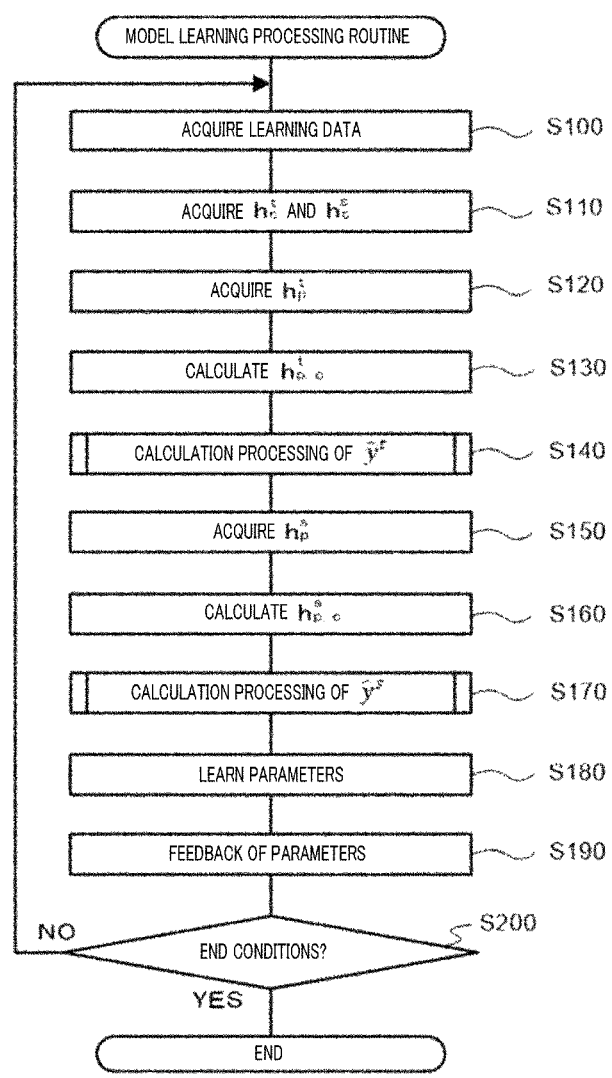
FIG. 3 is a flowchart illustrating a model learning processing routine for the model learning device according to the embodiment of the present invention.

FIG. 3 is a flowchart illustrating a model learning processing routine according to the embodiment of the present invention.

When learning data is input to the input unit 100, the model learning processing routine illustrated in FIG. 3 is executed at the model learning device 10.

First, in step S100, the input unit 100 accepts input of learning data, which is a set of data
$x^t$
of the target domain and training data
$y^t$
which is the result of executing a task with regard to the data $x^t$,
of the target domain, and a set of data
$x^s$
of the source domain and training data
$y^s$
which is the result of executing a task with regard to the data $x^s$
of the source domain.

Next, in step S110, the common encoding unit 110 executes encoding processing using the common encoder with data
$x^t$
of the target domain as input, thereby acquiring a common feature expression
$h_c^t$
and intermediate expressions CE-1 and CE-2. The common encoding unit 110 also executes encoding processing using the common encoder with data
$x^s$
of the source domain as input, thereby acquiring a common feature expression
$h_c^s$
and intermediate expressions CE-1 and CE-2.

In step S120, the target encoding unit 120 executes encoding processing using the target encoder with data
$x^t$
of the target domain as input, thereby acquiring a target feature expression
$h_p^t$
and intermediate expressions TE-1 and TE-2.

In step S130, the target decoding unit 130 calculates
$h_{p,c}^t$
which is the result of adding the target feature expression
$h_p^t$
that is the output of the target encoder, and the common feature expression
$h_c^t$
that is the output of the common encoder.

In step S140, the target decoding unit 130 executes decoding processing using the target decoder, with the
$h_{p,c}^t$
calculated in the above step S130, and the intermediate expressions CE-1 and CE-2 obtained regarding the data of the target domain in the above step S110 and the intermediate expressions TE-1 and TE-2 obtained in the above step S120, as input, to acquire
$\hat{y}^t$.

In step S150, the source encoding unit 140 executes encoding processing using the source encoder, with data
$x^s$
of the source domain as input, to acquire the source feature expression
$h_p^s$
and intermediate expressions SE-1 and SE-2.

In step S160, the source decoding unit 150 calculates
$h_{p,c}^t$
which is the result of adding the source feature expression
$h_p^s$
that is the output of the source encoder, and the common feature expression
$h_c^s$
that is the output of the common encoder.

In step S170, the source decoding unit 150 executes decoding processing using the source decoder, with the
$h_{p,c}^s$
calculated in the above step S160, and the intermediate expressions CE-1 and CE-2 obtained regarding the data of the source domain in the above step S110 and the intermediate expressions SE-1 and SE-2 obtained in the above step S150, as input, to acquire
$\hat{y}^s$.

In step S180, the learning unit 160 defines a loss function such as in Expression (1), using the target feature expression
$h_p^t$,
the source feature expression
$h_p^s$,
the common feature expressions
$h_c^t$
and
$h_c^s$,
the target decoder output
$\hat{y}^t$,
the source decoder output
$\hat{y}^s$,
and the training data
$y^t$
and
$y^s$, obtained by the above steps S110 to S170, to learn parameters of the encoders and decoders where the loss function is minimized.

In step S190, the learning unit 160 hands the learned target encoder parameters to the target encoding unit 120, the learned source encoder parameters to the source encoding unit 140, the learned common encoder parameters to the common encoding unit 110, the learned target decoder parameters to the target decoding unit 130, and the learned source decoder parameters to the source decoding unit 150, respectively.

In step S200, the learning unit 160 determines whether ending conditions are satisfied or not.

In a case where ending conditions are not satisfied (NO in step S200), the flow returns to the above step S100, learning data is acquired again, and the processing of steps S110 to S190 is repeated.

Conversely, in a case where ending conditions are satisfied (YES in step S200), the processing ends.

Figure 4:
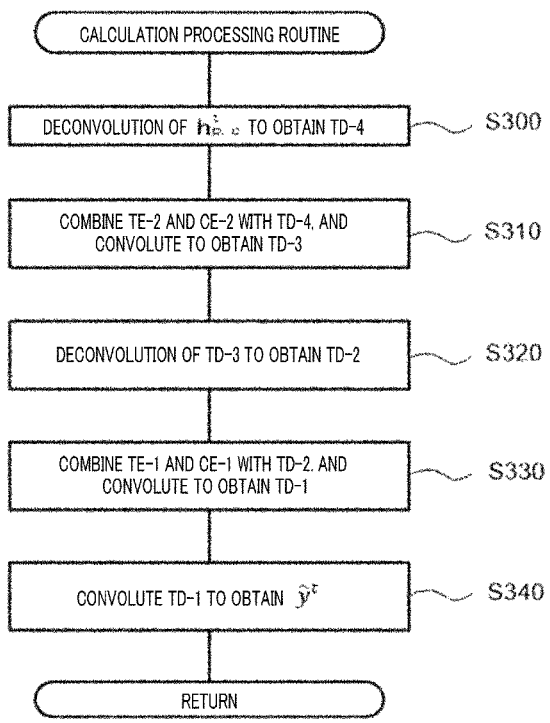
FIG. 4 is a flowchart illustrating a calculation processing routine for the model learning device according to the embodiment of the present invention.

Now, calculation processing of the target decoder in the above step S140 will be described. FIG. 4 is a flowchart illustrating the calculation processing routine.

In step S300, the target decoder performs deconvolution of the input $h_{p,c}^t$ and obtains TD-4.

In step S310, the target decoder performs convolution of a feature expression obtained by combining intermediate expressions TE-2 and CE-2 with TD-4 obtained in the above step S300, thereby obtaining TD-3.

In step S320, the target decoder further performs deconvolution of the TD-3 obtained in the above step S310, and obtains TD-2.

In step S330, the target decoder performs convolution of a feature expression obtained by combining intermediate expressions TE-1 and CE-1 with the TD-2 obtained in the above step S320, thereby obtaining TD-1.

In step S340, the target decoder performs convolution of the TD-1 obtained in the above step S330, obtains $\hat{y}^t$ as the output of the target decoder, and returns.

Calculation processing of the source decoder in the above step S170 is the same as the calculation processing routine in FIG. 4 above, and accordingly description will be omitted.

As described above, according to the model learning device of the embodiment of the present invention, by learning, on the basis of the learning data, so that the output of the target decoder matches the training data, and the output of the source decoder matches the training data, using the target encoder that takes data of the target domain as input and outputs a target feature expression, the source encoder that takes data of the source domain as input and outputs a source feature expression, the common encoder that takes data of the target domain or data of the source domain as input and outputs a common feature expression, the target decoder that takes output of the target encoder and output of the common encoder as input and outputs a result of executing a task with regard to data of the target domain, and the source decoder that takes output of the source encoder and output of the common encoder as input and outputs a result of executing a task with regard to data of the source domain, a plurality of different tasks and domains can be simultaneously learned, with low costs and high precision.

<Configuration of Task Processing Device According to Embodiment of Present Invention>

Figure 5:
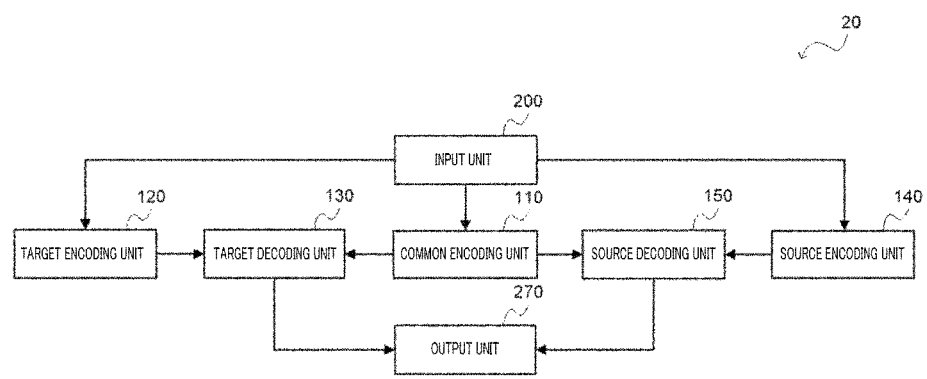
FIG. 5 is a block diagram illustrating a configuration of a task processing device according to the embodiment of the present invention.

The configuration of a task processing device 20 according to the embodiment of the present invention will be described. Note that configurations that are the same as those in the model learning device 10 according to the above embodiment are denoted by the same symbols, and detailed description will be omitted. FIG. 5 is a block diagram illustrating the configuration of the task processing device 20 according to the embodiment of the present invention.

The task processing device 20 executes tasks on data of the target domain, using a model learned by the model learning device 10. Note that in the present embodiment, a case where the type of data of the target domain is image data $x^t$ will be described.

The task processing device 20 is configured of a computer provided with a CPU, RAM, and ROM storing a program for executing a later-described task processing routine and a calculation processing routine, and functionally is configured as follows.

The task processing device 20 according to the present embodiment is configured having been provided with an input unit 200, a common encoding unit 110, a target encoding unit 120, a target decoding unit 130, a source encoding unit 140, a source decoding unit 150, and an output unit 270, as illustrated in FIG. 5.

The input unit 200 accepts input of image data $x^t$ of the target domain.

The input unit 200 then hands the accepted image data $x^t$ of the target domain to the common encoding unit 110 and target encoding unit 120.

The common encoding unit 110, target encoding unit 120, and target decoding unit 130 hold the parameters of the common encoder, target encoder, and target decoder, learned by the model learning device 10, and functionally perform processing the same as the processing in the model learning device 10.

The output unit 270 outputs $\hat{y}^t$ which is the result of this task processing obtained by the target decoding unit 130.

Note that in a case of executing a task with regard to image data $x^s$ of the source domain using a model learned by the model learning device 10, the source encoding unit 140 and source decoding unit 150 can be used in the task processing device 20 instead of the target encoding unit 120 and target decoding unit 130.

In this case, the input unit 200 hands the image data $x^s$ of the source domain that has been accepted to the common encoding unit 110 and source encoding unit 140.

The source encoding unit 140 and source decoding unit 150 hold the parameters of the source encoder and source decoder learned by the model learning device 10 and functionally perform processing the same as the processing in the model learning device 10.

The output unit 270 then outputs $\hat{y}^s$ which is the result of this task processing, obtained by the source decoding unit 150.

<Operations of Task Processing Device According to Embodiment of Present Invention>

Figure 6:
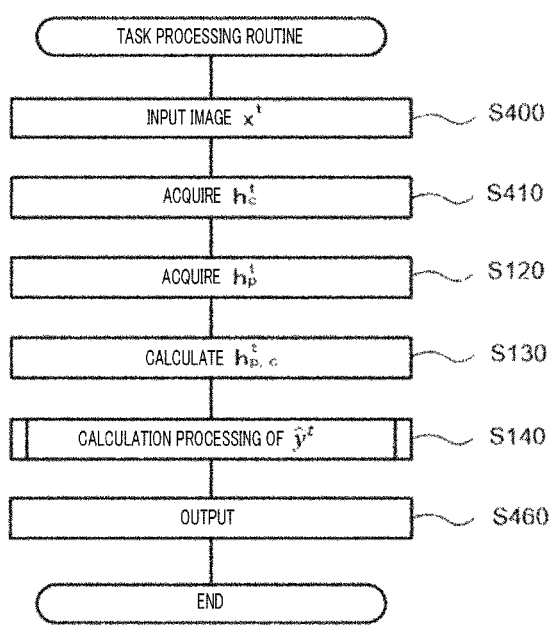
FIG. 6 is a flowchart illustrating a task processing routine for the task processing device according to the embodiment of the present invention.

FIG. 6 is a flowchart illustrating a task processing routine according to the embodiment of the present invention. Note that processing the same as in the model learning processing routine according to the embodiment described above is denoted by the same symbols, and detailed description will be omitted.

Upon image data $x^t$ of the target domain being input to the input unit 200, the task processing routine shown in FIG. 6 is executed at the task processing device 20.

In step S400, the input unit 200 accepts input of the image data $x^t$ of the target domain.

In step S410, the common encoding unit 110 executes encoding processing using the common encoder, with the data $x^t$ of the target domain as input, and acquires the common feature expression $h_c^t$ and intermediate expressions CE-1 and CE-2.

In step S460, the output unit 270 outputs $\hat{y}^t$ which is the result of this task processing, obtained in step S150.

Note that in a case where a task is executed with regard to the image data $x^s$ of the source domain, using a model learned by the model learning device 10, the source encoding unit 140 and source decoding unit 150 are used to perform the same processing, so description will be omitted.

As described above, according to the task processing device of the present embodiment, by using a model that has learned, on the basis of the learning data, so that the output of the target decoder matches the training data, and the output of the source decoder matches the training data, using the target encoder that takes data of the target domain as input and outputs a target feature expression, the source encoder that takes data of the source domain as input and outputs a source feature expression, the common encoder that takes data of the target domain or data of the source domain as input and outputs a common feature expression, the target decoder that takes output of the target encoder and output of the common encoder as input and outputs a result of executing a task with regard to data of the target domain, and the source decoder that takes output of the source encoder and output of the common encoder as input and outputs a result of executing a task with regard to data of the source domain, different tasks can be executed with low costs and high precision.

Note that the present invention is not limited to the above-described embodiment, and various modifications and applications may be made without departing from the essence of this invention.

For example, the encoders and decoders may be configured with more layers than the network configuration example illustrated in FIG. 2 above, or configured with fewer layers.

Also, although description has been made by way of an example of a case where a plurality of intermediate expressions from the target encoder and a plurality of intermediate expressions from the common encoder are input to the target decoder, this is not limiting, and it is sufficient for at least one intermediate expression from the target encoder and at least one intermediate expression from the common encoder to be input to the target decoder.

For example, a configuration may be made where the layer that obtains TE-2 in the target encoder is omitted, the layer that obtains SE-2 in the source encoder is omitted, the layer that obtains CE-2 in the common encoder is omitted, the layer that obtains TD-4 and TD-3 in the target decoder is omitted, and the layer that obtains SD-4 and SD-3 in the source decoder is omitted. In this case, the target decoder performs deconvolution of $h_{p,c}^t$ to the size of TD-2, combines with TE-1 and CE-1, and performs the subsequent processing.

Also, description has been made in the above-described embodiment regarding a configuration where the sizes of the outputs of intermediate layers of the common encoder, target encoder, and target decoder are the same. However, this is not limiting.

For example, it is sufficient for the target decoder to be able to combine the intermediate expressions TD-2 and TE-1 with CE-1, and as long as the matrix size of the intermediate expressions of the common encoder, target encoder, and target decoder (the matrix size of the intermediate expressions TD-2 and TE-1, and CE-1 expressed by cubes at "copy" in FIG. 2 above) are the same, the length of the channel count (depth) may be different.

For example, in a case where the sizes of the intermediate expressions are 3*3*10 and 3*3*20, only the channel count differs and combination can be performed, and thus this case can be employed. Conversely, in a case where the sizes of the intermediate expressions are 3*3*10 and 5*5*20, the matrix sizes are different and cannot be combined. Accordingly, such a configuration cannot be employed in the present embodiment.

Note that this holds for the common encoder, source encoder, and source decoder for the source domain, as well.

Also, although an embodiment has been described in the specification of the present application where the program is installed beforehand, this program may be stored in a computer-readable recording medium and thus provided.

REFERENCE SIGNS LIST

10 Model learning device
20 Task processing device
100 Input unit
110 Common encoding unit
120 Target encoding unit
130 Target decoding unit
140 Source encoding unit
150 Source decoding unit
160 Learning unit
200 Input unit
270 Output unit

The invention claimed is:

1. A computer-implemented method of training models for performing a task, the method comprising:
   receiving learning data, wherein the learning data includes:
      a first pair of data including:
         target domain data from a target domain, and
         first result data as first training data of performing a first task upon the target domain data, and a second pair of data including:
    source domain data from a source domain, and
    second result as second training of performing a second task upon the source domain data;
generating, by a target encoder based on the learning data, a target feature expression using the target domain data;
generating, by a source encoder based on the learning data, a source feature expression using the source domain data, wherein the source encoder is distinct from the target encoder;
generating, by a common encoder based at least on one of the target domain data or the source domain data, a common feature expression using common parameters for encoding the at least one of the target domain data or the source domain data, wherein the common encoder is distinct from the source encoder and the target encoder;
generating, by a target decoder based at least on a first feature expression set including the generated target feature expression and the generated common feature expression, the first result data of performing the first task upon the target domain data;
generating, by a source decoder based at least on a second feature expression set including the generated source feature expression and the generated common feature expression, the second result data of performing the second task upon the source domain data; and
training a combination of the target encoder, the source encoder, the common encoder, the target decoder, and the source decoder,
    wherein the first result data of performing the first task upon the target domain data is associated with the learning data, and
    wherein the second result data of performing the second task upon the source domain data is associated with the learning data.

2. The computer-implemented method of claim 1, the method further comprising:
    training the combination of the target encoder, the source encoder, the common encoder, the target decoder, and the source decoder using at least a loss function indicating:
        the generated first result data of performing the first task upon the target domain data matching the learning data,
        the generated second result data of performing the second task upon the source domain data matching the learning data,
        a first common feature expression based on the target domain data matching in expressions with a second common feature expression based on the source domain data,
        the generated first result data of performing the first task upon the target domain data is distinct in expressions from the first common feature expression, and
        the generated second result data of performing the second task upon the source domain data is distinct in expression from the second common feature expression.

3. The computer-implemented method of claim 1, the method further comprising:
    receiving, by the target decoder, either one of:
        a first addition of the generated target feature expression and the generated common feature expression, or
        a first combination of the generated target feature expression and the generated common feature expression; and
    receiving, by the source decoder, either one of:
        a second addition of the generated source feature expression and the generated common feature expression, or
        a second combination of the generated source feature expression and the generated common feature expression.

4. The computer-implemented method of claim 1, wherein one or more of the target encoder, the source encoder, the common encoder, the target decoder, and the source decoder is a neural network including a plurality of layers.

5. The computer-implemented method of claim 1, the method further comprising:
    receiving, by the target decoder, the generated target feature expression and the generated common feature expression;
    generating, by the target decoder, the first result data of performing the first task upon the target domain data using a first intermediate expression from a first intermediate layer of the target encoder and a second intermediate expression from a second intermediate layer of the common encoder;
    receiving, by the source decoder, the generated source feature expression and the generated common feature expression; and
    generating, by the source decoder, the second result data of performing the second task upon the source domain data using a third intermediate expression from a third intermediate layer of the source encoder and a fourth intermediate expression from a fourth intermediate layer of the common encoder.

6. The computer-implemented method of claim 1, wherein the target domain relates to a first view point of an object image for image recognition, wherein the source domain relates to a second view point of the object image for image recognition, and wherein the first view point and the second view point are distinct.

7. The computer-implemented method of claim 1, wherein the first task is associated with one of detection or segmentation of an image recognition task, and wherein the second task is associated with the other of the detection or the segmentation of the image recognition task.

8. A system of training models for performing a task, the system comprises:
    a processor; and
    a memory storing computer-executable instructions that when executed by the processor cause the system to:
        receive learning data, wherein the learning data includes:
            a first pair of data including:
                target domain data from a target domain, and
                first result data as first training data of performing a first task upon the target domain data, and
            a second pair of data including:
                source domain data from a source domain, and
                second result as second training of performing a second task upon the source domain data;
        generate, by a target encoder based on the learning data, a target feature expression using the target domain data;

generate, by a source encoder based on the learning data, a source feature expression using the source domain data, wherein the source encoder is distinct from the target encoder;

generate, by a common encoder based at least on one of the target domain data or the source domain data, a common feature expression using common parameters for encoding the at least one of the target domain data or the source domain data, wherein the common encoder is distinct from the source encoder and the target encoder;

generate, by a target decoder based at least on a first feature expression set including the generated target feature expression and the generated common feature expression, the first result data of performing the first task upon the target domain data;

generate, by a source decoder based at least on a second feature expression set including the generated source feature expression and the generated common feature expression, the second result data of performing the second task upon the source domain data; and train a combination of the target encoder, the source encoder, the common encoder, the target decoder, and the source decoder,
 wherein the first result data of performing the first task upon the target domain data is associated with the learning data, and
 wherein the second result data of performing the second task upon the source domain data is associated with the learning data.

9. The system of claim 8, the computer-executable instructions when executed further causing the system to:
 train the combination of the target encoder, the source encoder, the common encoder, the target decoder, and the source decoder using at least a loss function indicating:
  the generated first result data of performing the first task upon the target domain data matching the learning data,
  the generated second result data of performing the second task upon the source domain data matching the learning data,
  a first common feature expression based on the target domain data matching in expressions with a second common feature expression based on the source domain data,
  the generated first result data of performing the first task upon the target domain data is distinct in expressions from the first common feature expression, and
  the generated second result data of performing the second task upon the source domain data is distinct in expression from the second common feature expression.

10. The system of claim 8, the computer-executable instructions when executed further causing the system to:
 receive, by the target decoder, either one of:
  a first addition of the generated target feature expression and the generated common feature expression, or
  a first combination of the generated target feature expression and the generated common feature expression; and
 receive, by the source decoder, either one of:
  a second addition of the generated source feature expression and the generated common feature expression, or
  a second combination of the generated source feature expression and the generated common feature expression.

11. The system of claim 8, wherein one or more of the target encoder, the source encoder, the common encoder, the target decoder, and the source decoder is a neural network including a plurality of layers.

12. The system of claim 8, the computer-executable instructions when executed further causing the system to:
 receive, by the target decoder, the generated target feature expression and the generated common feature expression;
 generate, by the target decoder, the first result data of performing the first task upon the target domain data using a first intermediate expression from a first intermediate layer of the target encoder and a second intermediate expression from a second intermediate layer of the common encoder;
 receive, by the source decoder, the generated source feature expression and the generated common feature expression; and
 generate, by the source decoder, the second result data of performing the second task upon the source domain data using a third intermediate expression from a third intermediate layer of the source encoder and a fourth intermediate expression from a fourth intermediate layer of the common encoder.

13. The system of claim 8, wherein the target domain relates to a first view point of an object image for image recognition, wherein the source domain relates to a second view point of the object image for image recognition, and wherein the first view point and the second view point are distinct.

14. The system of claim 8, wherein the first task is associated with one of detection or segmentation of an image recognition task, and wherein the second task is associated with the other of the detection or the segmentation of the image recognition task.

15. A computer-readable non-transitory recording medium storing computer-executable instructions that when executed by a processor cause a computer system to:
 receive learning data, wherein the learning data includes:
  a first pair of data including:
   target domain data from a target domain, and
   first result data as first training data of performing a first task upon the target domain data, and
  a second pair of data including:
   source domain data from a source domain, and
   second result as second training of performing a second task upon the source domain data;
 generate, by a target encoder based on the learning data, a target feature expression using the target domain data;
 generate, by a source encoder based on the learning data, a source feature expression using the source domain data, wherein the source encoder is distinct from the target encoder;
 generate, by a common encoder based at least on one of the target domain data or the source domain data, a common feature expression using common parameters for encoding the at least one of the target domain data or the source domain data, wherein the common encoder is distinct from the source encoder and the target encoder;
 generate, by a target decoder based at least on a first feature expression set including the generated target feature expression and the generated common feature expression, the first result data of performing the first task upon the target domain data;

generate, by a source decoder based at least on a second feature expression set including the generated source feature expression and the generated common feature expression, the second result data of performing the second task upon the source domain data; and train a combination of the target encoder, the source encoder, the common encoder, the target decoder, and the source decoder,
wherein the first result data of performing the first task upon the target domain data is associated with the learning data, and
wherein the second result data of performing the second task upon the source domain data is associated with the learning data.

16. The computer-readable non-transitory recording medium of claim 15, the computer-executable instructions when executed further causing the system to:
training the combination of the target encoder, the source encoder, the common encoder, the target decoder, and the source decoder using at least a loss function indicating:
the generated first result data of performing the first task upon the target domain data matching the learning data,
the generated second result data of performing the second task upon the source domain data matching the learning data,
a first common feature expression based on the target domain data matching in expressions with a second common feature expression based on the source domain data,
the generated first result data of performing the first task upon the target domain data is distinct in expressions from the first common feature expression, and
the generated second result data of performing the second task upon the source domain data is distinct in expression from the second common feature expression.

17. The computer-readable non-transitory recording medium of claim 15, the computer-executable instructions when executed further causing the system to:
receive, by the target decoder, either one of:
a first addition of the generated target feature expression and the generated common feature expression, or
a first combination of the generated target feature expression and the generated common feature expression; and
receive, by the source decoder, either one of:
a second addition of the generated source feature expression and the generated common feature expression, or
a second combination of the generated source feature expression and the generated common feature expression.

18. The computer-readable non-transitory recording medium of claim 15, wherein one or more of the target encoder, the source encoder, the common encoder, the target decoder, and the source decoder is a neural network including a plurality of layers.

19. The computer-readable non-transitory recording medium of claim 15, the computer-executable instructions when executed further causing the system to:
receive, by the target decoder, the generated target feature expression and the generated common feature expression;
generate, by the target decoder, the first result data of performing the first task upon the target domain data using a first intermediate expression from a first intermediate layer of the target encoder and a second intermediate expression from a second intermediate layer of the common encoder;
receive, by the source decoder, the generated source feature expression and the generated common feature expression; and
generate, by the source decoder, the second result data of performing the second task upon the source domain data using a third intermediate expression from a third intermediate layer of the source encoder and a fourth intermediate expression from a fourth intermediate layer of the common encoder.

20. The computer-readable non-transitory recording medium of claim 15,
wherein the target domain relates to a first view point of an object image for image recognition, wherein the source domain relates to a second view point of the object image for image recognition, and wherein the first view point and the second view point are distinct, and
wherein the first task is associated with one of detection or segmentation of an image recognition task, and wherein the second task is associated with the other of the detection or the segmentation of the image recognition task.

* * * * *